(12) United States Patent
Knapper et al.

(10) Patent No.: US 9,889,420 B2
(45) Date of Patent: Feb. 13, 2018

(54) FLUID INJECTION NOZZLE FOR FLUID BED REACTORS

(71) Applicants: Brian Allen Knapper, Edmonton (CA); Christian Wolfgang Schroeter, Edmonton (CA); Robert William Skwarok, Edmonton (CA); Nicholas Prociw, North Vancouver (CA); Jennifer McMillan, Edmonton (CA)

(72) Inventors: Brian Allen Knapper, Edmonton (CA); Christian Wolfgang Schroeter, Edmonton (CA); Robert William Skwarok, Edmonton (CA); Nicholas Prociw, North Vancouver (CA); Jennifer McMillan, Edmonton (CA)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 14/955,134

(22) Filed: Dec. 1, 2015

(65) Prior Publication Data
US 2016/0158722 A1 Jun. 9, 2016

Related U.S. Application Data

(60) Provisional application No. 62/087,417, filed on Dec. 4, 2014.

(51) Int. Cl.
*B01J 8/00* (2006.01)
*B01J 8/18* (2006.01)
(Continued)

(52) U.S. Cl.
CPC .......... *B01J 8/1818* (2013.01); *B01J 8/1827* (2013.01); *B01J 8/24* (2013.01); *C10B 55/10* (2013.01);
(Continued)

(58) Field of Classification Search
CPC ..... B01J 8/00; B01J 8/18; B01J 8/1818; B01J 8/1827; B01J 8/24; B01J 2208/00796;
(Continued)

(56) References Cited

U.S. PATENT DOCUMENTS 5,794,857 A  8/1998 Chen et al.
6,003,789 A  12/1999 Base et al.
(Continued)

FOREIGN PATENT DOCUMENTS

CA  2224615  12/1997
EP  0454416 A2  10/1991
(Continued)

OTHER PUBLICATIONS

The International Search Report and Written Opinion of PCT/US2015/063108 dated Feb. 26, 2016.
(Continued)

*Primary Examiner* — Natasha Young
(74) *Attorney, Agent, or Firm* — Hsin Lin; Chad A. Guice

(57) ABSTRACT

A feed injector for a circulating fluid bed reactor is fitted with a discharge nozzle with a circular, radially notched discharge orifice to improve the surface-to-volume ratio of the spray pattern formed by the nozzle. The feed injector is useful for injecting fluids into various types of circulating fluid bed reactors in which good contact between the components of the fluidized bed and the injected fluid is required. It is particularly useful in fluid coking reactors.

15 Claims, 4 Drawing Sheets

Figure 1:
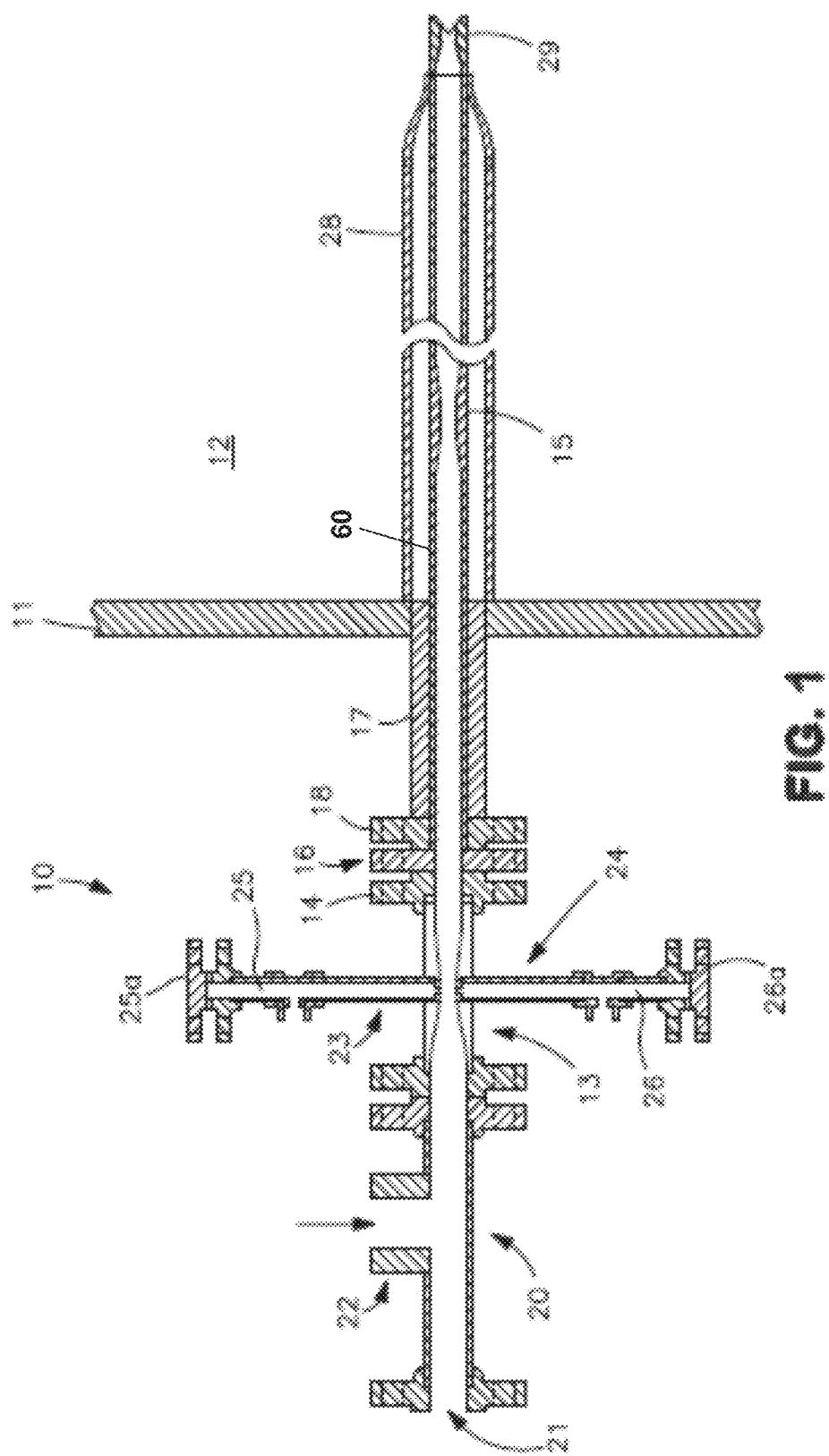

(51) Int. Cl.
*B01J 8/24* (2006.01)
*F23C 10/00* (2006.01)
*F23C 10/18* (2006.01)
*F23C 10/20* (2006.01)
*F23C 10/22* (2006.01)
*C10B 55/00* (2006.01)
*C10B 55/02* (2006.01)
*C10B 55/04* (2006.01)
*C10B 55/08* (2006.01)
*C10B 55/10* (2006.01)
*F23D 11/38* (2006.01)
*C10G 9/00* (2006.01)
*F23D 11/10* (2006.01)
*F23G 5/027* (2006.01)
*F23G 5/30* (2006.01)
*F23G 5/44* (2006.01)
*F23G 7/05* (2006.01)
*F23D 11/00* (2006.01)
*F23D 11/36* (2006.01)
*F23G 5/00* (2006.01)
*F23G 5/02* (2006.01)
*F23G 7/00* (2006.01)
*F23G 7/02* (2006.01)

(52) U.S. Cl.
CPC ............. *C10G 9/005* (2013.01); *F23C 10/22* (2013.01); *F23D 11/102* (2013.01); *F23D 11/38* (2013.01); *F23G 5/0276* (2013.01); *F23G 5/30* (2013.01); *F23G 5/446* (2013.01); *F23G 7/05* (2013.01); *B01J 2208/00902* (2013.01); *F23G 2201/40* (2013.01)

(58) Field of Classification Search
CPC ... B01J 2208/00893; B01J 2208/00902; F23C 10/00; F23C 10/18–10/22; C10G 9/00; C10G 9/005; F23D 11/00; F23D 11/10–11/102; C10B 55/00–55/04; C10B 55/08; C10B 55/10; F23G 5/00; F23G 5/02; F23G 5/027; F23G 5/0276; F23G 5/30; F23G 5/44; F23G 5/442; F23G 5/446; F23G 7/00; F23G 7/05; F23G 2201/00; F23G 2201/40
See application file for complete search history.

(56) References Cited

U.S. PATENT DOCUMENTS

| | | | |
|---|---|---|---|
| 6,082,635 A * | 7/2000 | Seiner | B64D 33/06 239/265.19 |
| 6,676,048 B1 | 1/2004 | Tiemann | |
| 6,899,453 B2 * | 5/2005 | Koch | B01F 5/0475 366/174.1 |
| 7,025,874 B2 | 4/2006 | Chan et al. | |
| 7,172,733 B2 | 2/2007 | Gauthier et al. | |
| 8,322,266 B2 * | 12/2012 | Presz, Jr. | F41A 21/34 89/14.2 |
| 2012/0063961 A1 | 3/2012 | Chan et al. | |

FOREIGN PATENT DOCUMENTS

| | | |
|---|---|---|
| GB | 131175 A | 8/1919 |
| WO | 2009/060642 A1 | 5/2009 |

OTHER PUBLICATIONS

P.K. House, M. Saberian, C.L. Briens, F. Berruti and E. Chan, "Injection of a Liquid Spray into a Fluidized Bed: Particle-Liquid Mixing and Impact on Fluid Coker Yields", Ind. Eng. Chem. Res., 2004, vol. 43, pp. 5663-5669.

* cited by examiner

FLUID INJECTION NOZZLE FOR FLUID BED REACTORS

CROSS-REFERENCE TO RELATED APPLICATIONS

This application claims priority to U.S. Provisional Application Ser. No. 62/087,417 filed Dec. 4, 2014, herein incorporated by reference in its entirety.

FIELD OF THE INVENTION

This invention relates to a nozzle useful for injecting fluids into circulating fluid bed reactors. It relates more particularly to a nozzle assembly useful for injecting heavy oils such as petroleum resids and bitumens into fluid coking reactors.

BACKGROUND OF THE INVENTION

Circulating fluid bed (CFB) reactors are well known devices that can be used to carry out a variety of multiphase chemical reactions. In this type of reactor, a fluid (gas or liquid) is passed through a granular solid material at velocities high enough to suspend the solid and cause it to behave as though it were a fluid. Fluidization is maintained by means of fluidizing gas such as air, steam or reactant gas injected through a distributor (grid, spargers or other means) at the base of the reactor. CFB reactors are now used in many industrial applications, among which are catalytic cracking of petroleum heavy oils, olefin polymerization, coal gasification, and water and waste treatment. One major utility is in the field of circulating fluid bed combustors where coal or another high sulfur fuel is burned in the presence of limestone to reduce SOx emissions; emissions of nitrogen oxides is also reduced as a result of the relatively lower temperatures attained in the bed. Another application is in the fluidized bed coking processes known as fluid coking and its variant, Flexicoking™, both of which were developed by Exxon Research and Engineering Company.

Fluidized bed coking is a petroleum refining process in which heavy petroleum feeds, typically the non-distillable residue (resid) from fractionation or heavy oils are converted to lighter, more useful products by thermal decomposition (coking) at elevated reaction temperatures, typically about 480 to 590° C., (about 900 to 1100° F.) and in most cases from 500 to 550° C. (about 930 to 1020° F.). Heavy oils which may be processed by the fluid coking process include heavy atmospheric resids, aromatic extracts, asphalts, and bitumens from oil sands, tar pits and pitch lakes of Canada (Athabasca, Alta.), Trinidad, Southern California (La Brea, Los Angeles), McKittrick (Bakersfield, Calif.), Carpinteria (Santa Barbara County, Calif.), Lake Bermudez (Venezuela) and similar deposits such as those found in Texas, Peru, Iran, Russia and Poland. The process is carried out in a unit with a large reactor vessel containing hot coke particles which are maintained in the fluidized condition at the required reaction temperature with steam injected at the bottom of the vessel with the average direction of movement of the coke particles being downwards through the bed. The heavy oil feed is heated to a pumpable temperature, typically in the range of 350 to 400° C. (about 660 to 750° F.) mixed with atomizing steam, and fed through multiple feed nozzles arranged at several successive levels in the reactor. Steam assisted atomization nozzles are used to spray the heavy oil feed into a fluidized bed of hot coke particles. The injected spray forms a jet in the bed into which fluidized coke particles are entrained. Effective mixing of the atomized feed droplets and the entrained coke particles is vital for improving reactor operability and liquid yield.

Fluidization steam is injected into a stripper section at the bottom of the reactor and passes upwards through the coke particles in the stripper as they descend from the main part of the reactor above. A part of the feed liquid coats the coke particles in the fluidized bed and subsequently decomposes into layers of solid coke and lighter products which evolve as gas or vaporized liquid. Reactor pressure is relatively low in order to favor vaporization of the hydrocarbon vapors, typically in the range of about 120 to 400 kPag (about 17 to 58 psig), and most usually from about 200 to 350 kPag (about 29 to 51 psig). The light hydrocarbon products of the coking (thermal cracking) reactions vaporize, mix with the fluidizing steam and pass upwardly through the fluidized bed into a dilute phase zone above the dense fluidized bed of coke particles. This mixture of vaporized hydrocarbon products formed in the coking reactions continues to flow upwardly through the dilute phase with the steam at superficial velocities of about 1 to 2 meters per second (about 3 to 6 feet per second), entraining some fine solid particles of coke. Most of the entrained solids are separated from the gas phase by centrifugal force in one or more cyclone separators, and are returned to the dense fluidized bed by gravity through the cyclone diplegs. The mixture of steam and hydrocarbon vapor from the reactor is subsequently discharged from the cyclone gas outlets into a scrubber section in a plenum located above the reaction section and separated from it by a partition. It is quenched in the scrubber section by contact with liquid descending over scrubber sheds in a scrubber section. A pumparound loop circulates condensed liquid to an external cooler and back to the top row of scrubber section to provide cooling for the quench and condensation of the heaviest fraction of the liquid product. This heavy fraction is typically recycled to extinction by feeding back to the fluidized bed reaction zone.

The Flexicoking™ process, also developed by Exxon Research and Engineering Company, is, in fact, a fluid coking process that is operated in a unit including a reactor and burner, often referred to as a heater in this variant of the process, as described above but also including a gasifier for gasifying the coke product by reaction with an air/steam mixture to form a low heating value fuel gas. The heater, in this case, is operated with an oxygen depleted environment. The gasifier product gas, containing entrained coke particles, is returned to the heater to provide a portion of the reactor heat requirement. A return stream of coke sent from the gasifier to the heater provides the remainder of the heat requirement. Hot coke gas leaving the heater is used to generate high-pressure steam before being processed for cleanup. The coke product is continuously removed from the reactor. In view of the similarity between the Flexicoking process and the fluid coking process, the term "fluid coking" is used in this specification to refer to and comprehend both fluid coking and Flexicoking except when a differentiation is required.

The dense fluid bed behaves generally as a well-mixed reactor. However model simulations using cold flow dynamics and tracer studies have shown that significant amounts of wetted coke can rapidly bypass the reaction section and contact the stripper sheds where a portion of the wet film is converted to coke, binding the coke particles together. Over time, hydrocarbon species from the vapor phase condense in the interstices between the particles, creating deposits which are very hard and difficult to remove.

One approach both to reducing reactor fouling and to increase liquid yield has been to improve the atomization of the feed as it enters the bed with the expectation that improved atomization will reduce the extent to which the oil will be carried down in liquid form into the stripper. Conventional atomization nozzles used in the fluid coking process use steam to assist in spraying the heated resid or bitumen into the fluidized bed of hot coke particles: effective contacting of resid droplets and the entrained coke particles is important in improving reactor operability and liquid product yield. The injected spray forms a jet in the bed into which fluidized coke particles are entrained. A major concern with poorly performing atomization nozzles is that liquid-solid agglomerates tend to form in the bed, causing high local liquid loading on the solids with the formation of large wet feed/coke agglomerates with particle sizes substantially larger than the bulk solids average. These heavier agglomerates may tend to segregate towards the lower section of the reactor and foul the internals of the reactor, particularly in the stripper section. These agglomerates also suffer from increased heat and mass transfer limitations and reduce liquid yields. With enhanced feed atomization performance, the contacting between the atomized feed and coke solids would be improved, resulting in an overall improvement in reactor operability, with longer run-lengths due to reduced reactor fouling, and/or higher liquid product yield due to lower reactor temperature operation. By spreading the liquid more evenly over the coke particles thinner liquid films would be created, reducing the heat and mass transfer limitations with liquid yields. Higher liquid feed rates may also be facilitated by the use of improved feed nozzles.

A steam assisted nozzle proposed for use in fluid coking units is described in U.S. Pat. No. 6,003,789 (Base) and CA 2 224 615 (Chan). In this nozzle, which is typically mounted on the side wall of the fluid coker so that it extends through the wall into the fluidized bed of coke particles, a bubbly flow stream of a heavy oil/steam mixture is produced and atomized at the nozzle orifice. The nozzle which is used has a circular flow passageway comprising in sequence: an inlet; a first convergence or contraction section of reducing diameter; a diffuser section of expanding diameter; a second contraction section of reducing diameter; and an orifice outlet. The convergent sections accelerate the flow mixture and induce bubble size reduction by elongation and shear stress flow mechanisms. The second contraction section is designed to accelerate the mixture flow more than the first contraction section and as a result, the bubbles produced by the first contraction are further reduced in size in the second contraction. The diffuser section allows the mixture to decelerate and slow down before being accelerated for the second time. The objective is to reduce the average mean diameter of the droplets exiting the nozzle to a relatively fine size, typically in the order of 300 µm as it is reported that the highest probability of collision of heavy oil droplets with heated coke particles occurs when both the droplets and heated particles have similar diameters; thus a droplet size of 200 or 300 µm was considered to be desirable. The objective behind the nozzle of U.S. Pat. No. 6,003,789 is to produce a spray of fine oil droplets which, according to the conventional view, would result in better contact between the coke particles and the oil droplets. A subsequent approach detailed in concept in *"Injection of a Liquid Spray into a Fluidized Bed: Particle-Liquid Mixing and Impact on Fluid Coker Yields"*, Ind. Eng. Chem. Res., 43 (18), 5663., House, P. et al., proposes that the initial contact and mixing between the liquid droplets and the hot coke particles should be enhanced, with less regard to the size of the liquid droplets in the spray.

A spray nozzle using a draft tube is proposed and described in U.S. Pat. No. 7,025,874 (Chan). This nozzle device functions by utilizing the momentum of the liquid jet issuing from the nozzle orifice to draw solids into the draft tube mixer and induce intense mixing of the solids and liquid in the mixer and by so doing, enhance the probability of individual droplets and particles coming into contact. As a result, more coke particles were likely to be thinly coated with oil, leading to improvement in liquid yield; the production of agglomerates would be curtailed, leading to a reduction in fouling and the reactor operating temperature could be reduced while still achieving high liquid product yield by reducing the mass transfer limitation on the liquid vaporization process. The actual assembly comprises an atomizing nozzle for producing the jet which extends through the side wall of the reactor and an open-ended draft tube type mixer positioned horizontally within the reactor and aligned with the nozzle so that the atomized jet from the nozzle will move through the tube and entrain a stream of coke particles and fluidizing gas into the tube where mixing of the coke and liquid droplets takes place. The draft tube preferably has a venturi section to promote a low pressure condition within the tube to assist induction of the coke particles and fluidizing gas. This device has not, however, been commercially successful due to concerns over fouling of the assembly in the fluidized bed.

The circular exit orifice on the nozzles shown, for example, in the Base and Chan patents, creates a cylindrical plume of liquid where the majority of the liquid is concentrated along the central jet axis, with limited ability of the entrained coke particles to penetrate to the central region of the jet; this plume has a minimum surface area to volume ratio and this creates a significant hindrance to the penetration of solid coke particles to the central core of the jet, leading to contact between the hot coke particles and the injected oil stream which is less than optimal.

US 2012/0063961 (Chan) describes an improved liquid feed nozzle useful in fluid coking units using heavy oil feeds such an oil sands bitumen which is fitted with a cloverleaf disperser at the outlet to provide a spray of liquid feed having an increased surface area relative to a cylindrical jet. The larger surface area of this plume increases solids entrainment into the jet and draws the liquid from the center of the jet to the lobes of the cloverleaf, improving the contact of liquid and solids in the fluidized bed.

While rectangular or slitted nozzles, as described, for example, in EP 454 416 (Steffens), U.S. Pat. No. 7,172,733 (Gauthier) and U.S. Pat. No. 5,794,857 (Chen), have been utilized to produce fan shaped sprays from the feed injectors for fluid catalytic cracking units, they are less desirable for use in fluid coking reactors because of the potential for plugging from excessive solids during process excursions. A certain minimum clearance is therefore required for the nozzle outlet, and a circular exit offers the greatest clearance. There is therefore a need for a nozzle assembly which is capable of improving the dispersion of the injected feed into the fluidized bed of coke particles in the fluid coking reactor.

SUMMARY OF THE INVENTION

It has now been found that a simple nozzle aperture of circular cross-section can be modified to produce a spray of increased dispersion by adding lateral notches at the exit orifice to increase the surface area and minimize the formation of the liquid-rich central region which is exceedingly detrimental to contact between the spray plume and the particles in the bed. The nozzle utilizes steam to accelerate and atomize the feed into a spray with significantly improved dispersion; the expansion of the steam upon exiting the confines of the flow passage in the body of the nozzle drives the oil/steam mixture into the notches as it leaves the nozzle, forming a spray pattern of increased surface/volume ratio.

According to the present invention, the feed injector has a nozzle with a circular, radially notched orifice. The feed injector is useful for injecting fluids into various types of circulating fluid bed reactors in which good contact between the fluidized solids and the injected fluid is required. It is particularly useful in fluid coking reactors (including within this classification, Flexicoking™ units) and is also potentially useful in other CFB reactors where similar problems are encountered.

The circulating fluid bed units have a reactor wall of circular cross section about a vertical axis, a lower inlet for fluidizing gas and feed injectors for a liquid heavy oil feed and atomizing steam around the reactor wall and above the lower fluidizing gas inlet. Each of the feed injectors, which extend through the reactor wall into the reactor with a discharge nozzle within the reactor and have inlets for the liquid heavy oil feed and the atomizing steam at the end remote from the discharge nozzle, comprise a flow conduit for conducting the oil and the steam to a discharge nozzle having a central flow passage of circular cross-section extending from the flow conduit to the radially notched discharge orifice.

In the preferred form used in fluid coking units, the reactor of the unit comprises: a dense bed reaction section confined by the reactor wall, typically of frusto-conical configuration with its major cross-section uppermost; a base region below the dense bed reaction section at which fluidizing gas is injected to fluidize the dense bed of finely-divided solid coke particles in the dense bed reaction section; heavy oil inlets with their feed injectors located around the periphery of the reactor wall at multiple elevations above the base region; a plenum or scrubber section above the dense bed reaction section and separated from the dense bed reaction section; cyclones at the top of the dense bed reaction section, each of which has a cyclone inlet for the flow of exiting gas and coke particles, a cyclone gas outlet exhausting into the plenum above the reaction section, and a cyclone dipleg for returning coke particles separated from the gas in the cyclone into the dense bed reaction section; a stripping section at the base region of the reactor comprising stripper sheds and spargers for stripping steam.

The reactor will be coupled in the unit to a burner/heater by means of coke lines in the normal way: a cold coke transfer line takes coke from the bottom of the stripper to the burner/heater and a hot coke return line brings hot coke from the burner/heater back to the reactor. In the case of a Flexicoker, the gasifier section follows the heater vessel as described above.

In the reactor the feed inlet nozzles are disposed at the upper end of the reactor and substantially horizontally around the periphery of the reactor; these feed inlet nozzles convey the heavy oil feed into the reactor. They each have a feed nozzle assembly as described above to provide the optimal configuration for the spray entering the reactor from the nozzle.

In its preferred form, the injectors utilize a converging-diverging premixer section to introduce atomization steam into the heavy oil stream under pressure. The stability in feed flow imparted by the use of a premixer is further improved by the use of the constricting-expanding flow conditioner or stabilizer in the flow conduit between the premixer and the discharge nozzle. Preferred forms of the premixer and flow conditioner are described in US 2012/0063961 or U.S. Application No. 62/042,911, filed 28 Aug. 2014, to which reference is made for details of the premixer and flow conditioner.

DRAWINGS

Figure 2:
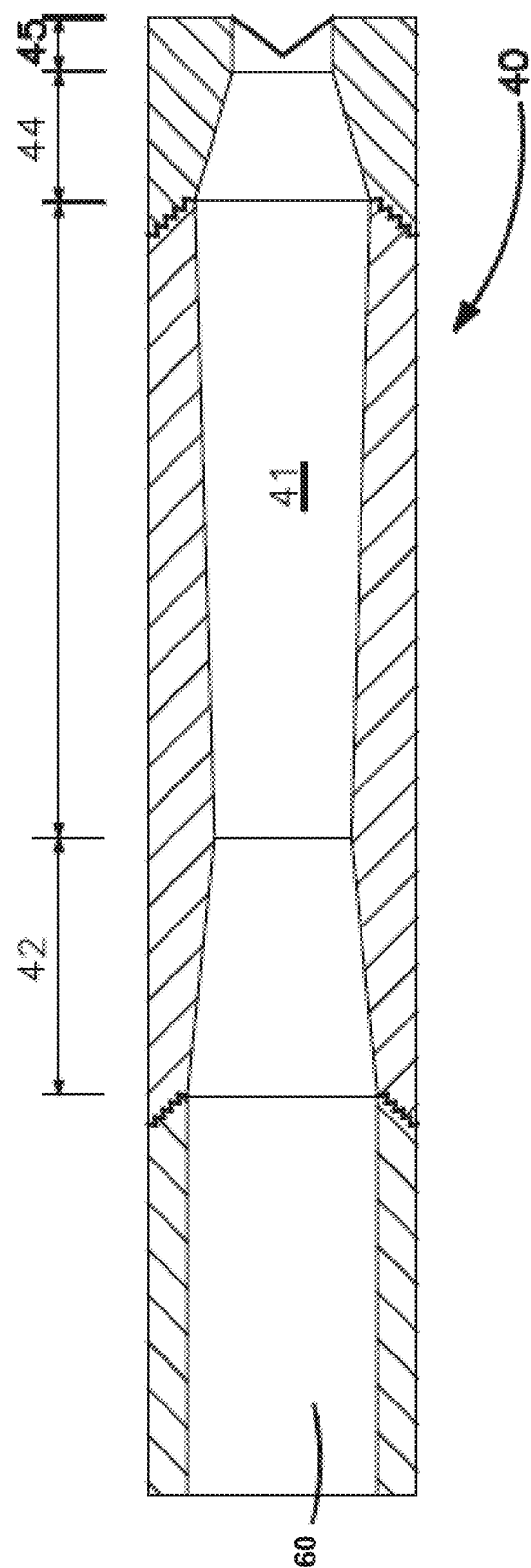
Figure 3:
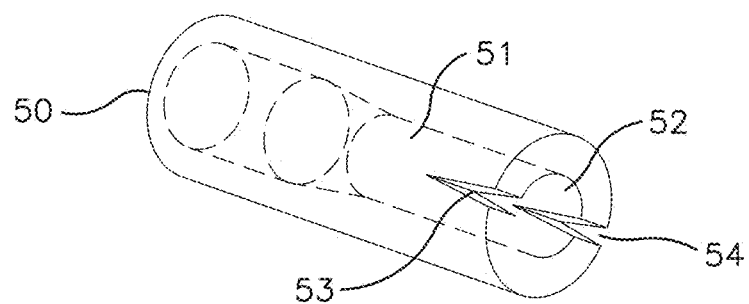
Figure 4:
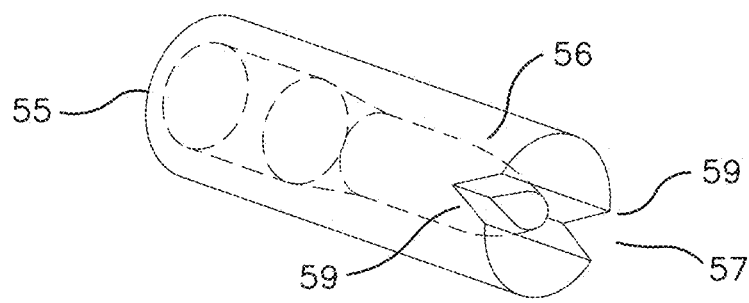
Figure 5:
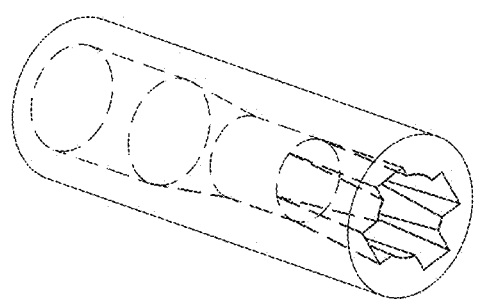

In the accompanying drawings:
FIG. 1 shows a nozzle assembly in section incorporating a premixer, flow conditioner and discharge nozzle;
FIG. 2 shows a longitudinal section on an enlarged scale of a discharge nozzle;
FIG. 3 shows a notched discharge nozzle;
FIG. 4 shows a second form of notched discharge nozzle;
FIG. 5 shows another form of notched discharge nozzle;
FIGS. 6 to 9 show the spray patterns produced by various nozzles in cold flow tests.

DETAILED DESCRIPTION

Nozzle Assembly

A complete nozzle assembly for producing the improved feed dispersion in the fluidized bed is shown in FIG. 1. The nozzle assembly 10 extends through the wall 11 of the reactor of the fluidized bed unit, e.g. fluidized coker unit, into its interior 12. The nozzle assembly comprises a throttle body premixer section 13 of the type shown in US 2012/0063961 to which reference is made for a full description of the nozzle and its mode of operation. Another preferred alternative premixer configuration is shown in U.S. Application Ser. No. 62/042,911, filed 28 Aug. 2014, to which reference is made for a description of that premixer. Flow conduit 60 which extends from the premixer to the discharge nozzle is fitted with flange 16 at its entry or upstream end to provide a fluid flow connection with flange 14 on the end of the premixer body. The flow conduit has a flow conditioner 15 in the form of a converging-diverging section along its length and upstream of the discharge nozzle 29 at the point indicated by 15. Flow conduit 60 is of circular cross-section and has discharge nozzle 29 at its tip inside the reactor. The nozzle assembly is retained, together with the premixer section on flanged end 18 of exterior support shroud 17, in the conventional manner with through bolts (not shown). Conduit 20 is flanged onto the entry side of premixer section 13 and extends to a cleaning port 21 which, in operation is normally closed by a flanged-on cover plate (not shown). The cleaning port is provided to allow for the nozzle assembly to be cleaned of fouling by passing a cleaning rod in through the uncovered cleaning port as far as the discharge nozzle and, if the rod is small enough, through the discharge orifice at the inner end of the nozzle. It may also be cleaned by using a high pressure water wash.

Inlet port 22 is provided for the heavy oil feed and atomizing steam enters through two radially opposed steam inlet lines 23, 24, into steam inlet ports disposed at the beginning of the convergence zone forming the entry to the throttle body constriction in the premixer section which also has a throat followed by a divergence zone. Vigorous mixing of the heavy oil feed with the injected steam is initiated in the throat and the following divergence section and continues along the flow conduit, assisted by the flow conditioner in the conduit. The inlet and outlet diameters of the passage through the premixer will generally be the same. The steam lines are also provided with cleaning ports at their outer ends, normally covered by flanged cover plates, to permit cleaning rods to be passed to the inlet ports in the body of the premixer.

Conduit 60 leads from the premixer through the wall 11 of the reactor and inside the reactor is encased in interior shroud 28 as far as the discharge nozzle, mainly for structural support and to protect the conduit from erosion by the solids circulating in the reactor.

The number of steam ports may be varied according to service requirements and the size of the assembly and usually from two to six are suitable, in most cases from two to four. Two ports have been found to give good results and also can be made large enough to reduce the likelihood of becoming fouled. Symmetrical radial port disposition is preferred, e.g. with two ports diametrically opposite and with four ports, at the quadrants. The steam ports are preferably opposed in pairs to promote mixing and atomization of the feed by the impact of the opposed steam jets from the ports onto one another; erosion of the premixer walls by impingement of steam from an unopposed port is also reduced. The mixing of the gas and liquid just at the entry to the throat region is considered optimal for good mixing, stable bubble flow with reduced pressure pulsation and reduced erosion in the throat section itself.

Significant performance criteria for the design of the premixer are described in US 2012/0063961 and U.S. Application Ser. No. 62/042,911, filed 28 Aug. 2014, including convergence angle at entry to the throat, throat diameter and length, divergence angles from the throat, entry and exit diameter. Erosion-resistant materials, such as Stellite, may be used to construct the throat region of premixers, or alternatively, it could be made by Hot Isostatic Pressing in order to reduce erosion.

Flow Conditioner

The nozzle assembly functions well with a plain, tubular flow conduit of constant cross-section between the premixer and the discharge nozzle as shown in FIG. 1 but the turbulent flow in conduit 60 downstream of the premixer 13 may be further stabilized and the dispersed bubbly flow maintained prior to the discharge nozzle by means of a flow stabilizer or conditioner 15 in the flow conduit 60. The flow conditioner is preferably located for improved flow stability towards the discharge end of the flow conduit, preferably within the second half of its length between the premixer and the discharge nozzle, that is, closer to the discharge nozzle than to the premixer. Generally, the flow conditioner will comprise a convergence section followed by a divergence section with a cylindrical section in between. The flow conditioner has been found to improve the stability of the flow leading to the nozzle.

A preferred configuration for the internal contours of the discharge nozzle is shown in FIG. 2. It has an axial flow passageway 41 extending from one end to the other with a suitable connector at the upstream end for connection to the end of conduit 60; because of the high temperatures encountered in operation and the types of materials passing through the nozzle the nozzle 29 is preferably welded onto the end of the flow conduit. The central passageway in the nozzle comprises, in sequence: a convergence zone 42 which follows directly on from flow conduit 60 and which narrows to a throat 43 followed by a divergent diffusion zone 41 which is followed by a second convergence zone 44 in the body of the nozzle followed, in turn by the nozzle orifice itself 45. The diameter and length of the circular flow passage in the nozzle body will also affect the stability of the dispersed bubbly flow formed in the flow conduit and flow conditioner and therefore the atomization performance of the nozzle. An excessively long residence time in the flow conduit will lead to coalescence of bubbles and instability of the two-phase flow. Hence there is a balance in the selection of the conduit diameter/length ratio between the need to keep the fluid residence time in the conduit to a minimum and the contribution of the pressure drop in the conduit to the overall pressure requirement for the nozzle. Further details of preferred features of the flow conditioners are described in US 201210063961 and U.S. Ser. No. 62/042,911 to which reference is made for such details.

Discharge Nozzle

The purpose of the nozzle is to draw liquid off the centerline to maximize liquid contacting with the solids. This allows the feed to coat the coke particles more uniformly and on average, with thinner films. Since the diffusion path is shorter in a thinner film, there tends to be less secondary cracking resulting in improved liquid yields. According to the present invention, the body of the nozzle has a laterally notched discharge orifice. The notches preferably extend from the central flow passage of the nozzle to its periphery and may conveniently be made in the form of v-notches (pie segment) or grooves e.g. of semi-circular or rectangular cross-section. Depending upon the spray pattern found to be most effective in a given reactor with its normal feeds, different notch configurations may be used: in addition, the spray pattern will also vary with the configuration of the nozzle body, especially its shape immediately upstream of the discharge orifice.

Two preferred forms of nozzles with radially notched discharge orifices are shown in FIGS. 3 and 4. In nozzle 50 shown in FIG. 3, the central flow passage 51 is cylindrical in shape immediately upstream of the discharge aperture 52. Two v-shaped, radially opposed notches 53, 54, are cut into the body of the nozzle and extend across the front face of the nozzle from the edge of the central flow passage to the outer edge of the nozzle. Nozzle 55 of FIG. 4 differs in that the central flow passage 56 converges immediately upstream of the discharge orifice in the direction of the orifice. In this case, the notch is cut with a wider angle than that of FIG. 3 to allow for increased expansion of the steam/oil mixture in the nozzle after the convergence zone immediately upstream of the discharge orifice. It is possible to provide more than two notches as shown: for example, three or four can be milled into the nozzle with a consequent change in the shape of the spray pattern as discussed further below Another form of notched nozzle is shown in FIG. 5. In this case, the notches do not extend over the entire width of the end face of the nozzle but instead, extend outwards from the central flow passage partway to the outer curved face of the nozzle. The notches are approximately rectangular in shape and are shown as being of constant width (radial dimension) but alternatively, could diminish in width with increasing depth into the nozzle body so as to form a notch which increases in width from the interior of the nozzle towards the end face of the nozzle. These part radial notches need not be rectangular or approximately so (those in FIG. 5 have curved outer faces to provide a constant wall thickness to the nozzle) but could be v-shaped similar to those of FIGS. 3 and 4 but not extending all the way from the central flow passage to the outer edge of the face of the nozzle. Again, as with FIGS. 3 and 4, it is possible to provide more than two notches as shown: for example, three or four can be milled into the nozzle with a consequent changes in the shape of the spray pattern as discussed further below.

Figure 6:
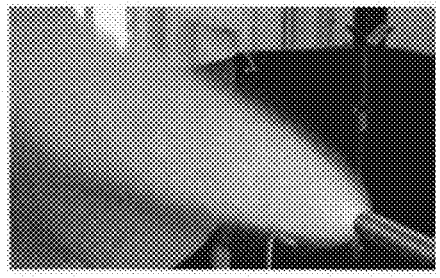
Figure 7:
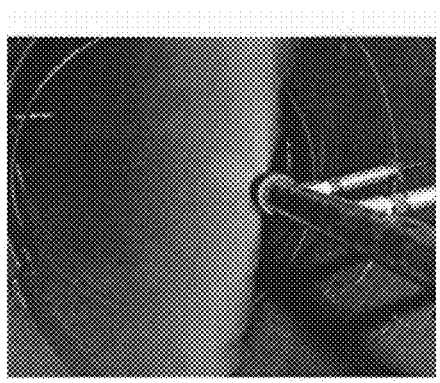
Figure 8:
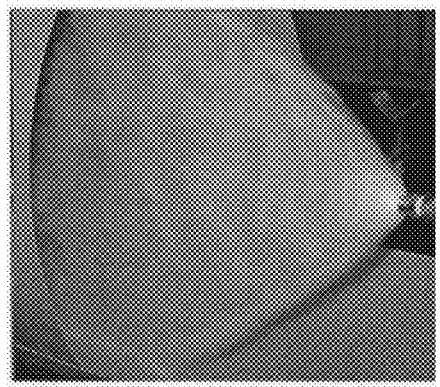
Figure 9:
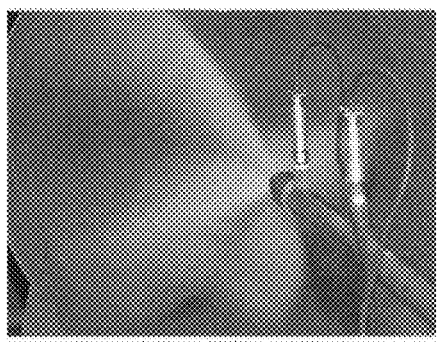

The effect on the spray pattern is shown in FIGS. 6 to 9. For these studies, open air, cold flow experiments were carried out on full scale nozzles using water as the liquid and compressed air standing in for steam. FIG. 6 shows an example of the spray pattern produced with a plain circular nozzle. The plume from this type of nozzle would enter the bed of coke particles in the form of a fairly columnar jet which, as noted above, has a minimal surface to volume ratio and so inhibits entrainment of the solids into the jet. FIG. 7 shows the fan-shaped spray pattern produced by a nozzle of the type shown in FIG. 3 with a cylindrical flow passage leading into the discharge orifice and with two radially opposed v-notches extending across the face of the nozzle. FIG. 8 shows that a similar shaped spray pattern is produced with a nozzle of the type shown in FIG. 4 with a converging flow passage leading into the discharge orifice and with two radially opposed v-notches extending across the face of the nozzle (due to the different angle in the photograph the pattern appears to be conical but this spray is also fan shaped). These fan shaped spray patterns are far more favorable to solids entrainment than the columnar pattern shown in FIG. 6. The effect of using a nozzle with four radially cut notches is shown in FIG. 9: a cruciform pattern is produced by four v-shaped radial notches cut into the end face of the nozzle.

The outer surface area of the jets produced by the radially notched nozzles is much greater than that produced with the standard circular nozzle. For the same volumetric flow rate the single fan spray pattern increases the surface area by approximately 400% and the cruciform fan increases the surface area by approximately 800%. As the entrainment of coke into the jet is proportional to the surface area, entrainment is also increased proportionally.

Tests were also performed by spraying nozzles with notched exits into a large fluidized bed and measuring the agglomerate breakage rate. The nozzles with notches produced fewer, weaker agglomerates which increased the agglomerate breakage rate by 30% compared to the standard circular nozzle. The notched nozzles were able to entrain more solid particles into the spray and improve the liquid-solid contacting significantly.

The invention claimed is:

1. A feed injector for a circulating fluid bed comprising an inlet for a heavy oil feed, at least one inlet for atomizing steam, a flow conduit for conducting the oil and the steam to a discharge nozzle having a central flow passage of circular cross-section extending from the flow conduit to a radially notched discharge orifice.

2. A feed injector according to claim 1 in which the central flow passage of discharge nozzle extends to an end face having radially opposed notches.

3. A feed injector according to claim 2 in which the radially opposed notches are v-shaped notches.

4. A feed injector according to claim 2 in which the radially opposed notches are notches of rectangular cross-section.

5. A feed injector according to claim 2 in which the notches extend from the central flow passage of the nozzle radially outwards to the edge of the nozzle.

6. A circulating fluid bed reactor having a reactor wall of circular cross section about a vertical axis, a lower inlet for fluidizing gas and feed injectors for a liquid heavy oil feed and atomizing steam around the reactor wall and above the lower fluidizing gas inlet, the feed injectors each extending through the reactor wall into the reactor with a discharge nozzle within the reactor and an inlet for the liquid heavy oil feed at the end remote from the discharge nozzle; each feed injector comprising:

a flow conduit for conducting the oil and the steam to a discharge nozzle having a central flow passage of circular cross-section extending from the flow conduit to a radially notched discharge orifice.

7. A circulating fluid bed reactor according to claim 6 in which the central flow passage of the discharge nozzle extends to an end face having radially opposed notches.

8. A circulating fluid bed reactor according to claim 6 in which the radially opposed notches are v-shaped notches.

9. A circulating fluid bed reactor according to claim 6 in which the radially opposed notches are notches of rectangular cross-section.

10. A circulating fluid bed reactor according to claim 6 in which the notches extend from the central flow passage of the nozzle radially outwards to the edge of the nozzle.

11. A fluid coking reactor having a reactor wall of circular cross section about a vertical axis, a lower inlet for fluidizing gas and feed injectors for a liquid heavy oil feed and atomizing steam around the reactor wall and above the lower fluidizing gas inlet, the feed injectors each extending through the reactor wall into the reactor with a discharge nozzle within the reactor and inlets for the liquid heavy oil feed and atomizing steam at the end remote from the discharge nozzle; each feed injector comprising:

a flow conduit for conducting the oil and the steam to a discharge nozzle having a central flow passage of circular cross-section extending from the flow conduit to a radially notched discharge orifice.

12. A fluid coking reactor according to claim 11 in which the central flow passage of the discharge nozzle extends to an end face having radially opposed notches.

13. A fluid coking reactor according to claim 11 in which the radially opposed notches are v-shaped notches.

14. A fluid coking reactor according to claim 11 in which the radially opposed notches are notches of rectangular cross-section.

15. A fluid coking reactor according to claim 11 in which the notches extend from the central flow passage of the nozzle radially outwards to the edge of the nozzle.

* * * * *